(12) United States Patent
Nagayama et al.

(10) Patent No.: US 8,109,108 B2
(45) Date of Patent: Feb. 7, 2012

(54) AUTOMOTIVE VENTILATION APPARATUS AND AUTOMOTIVE VENTILATION METHOD

(75) Inventors: Hiroki Nagayama, Yokohama (JP); Hajime Kato, Ebina (JP); Teruaki Ishikawa, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 1382 days.

(21) Appl. No.: 11/360,511

(22) Filed: Feb. 24, 2006

(65) Prior Publication Data
US 2006/0196652 A1 Sep. 7, 2006

(30) Foreign Application Priority Data

Mar. 2, 2005 (JP) ................................. 2005-057722
Apr. 7, 2005 (JP) ................................. 2005-110767

(51) Int. Cl.
*B60H 1/32* (2006.01)
(52) U.S. Cl. ................ 62/244; 62/186; 165/41; 165/42; 165/43; 165/204
(58) Field of Classification Search .................... 62/244, 62/186; 165/41–43, 204
See application file for complete search history.

(56) References Cited

U.S. PATENT DOCUMENTS

| | | | |
|---|---|---|---|
| 6,263,685 B1 * | 7/2001 | Strobel | 62/133 |
| 6,796,894 B1 * | 9/2004 | Matsuno et al. | 454/139 |
| 2004/0194479 A1 | 10/2004 | Umebayashi et al. | |
| 2006/0075766 A1 * | 4/2006 | Ziehr et al. | 62/186 |

FOREIGN PATENT DOCUMENTS

| | | | |
|---|---|---|---|
| JP | 5-131843 A | | 5/1993 |
| JP | 05178080 A | * | 7/1993 |
| JP | 11-165529 A | | 6/1999 |
| JP | 2003-237358 A | | 8/2003 |
| JP | 2004-084970 A | | 3/2004 |
| JP | 2004-106587 A | | 4/2004 |
| JP | 2004-256092 A | | 9/2004 |
| JP | 2005-001539 A | | 1/2005 |
| JP | 2005-041356 A | | 2/2005 |

* cited by examiner

*Primary Examiner* — Frantz Jules
*Assistant Examiner* — Azim Rahim
(74) *Attorney, Agent, or Firm* — Foley & Lardner LLP

(57) ABSTRACT

A ventilation flow path through which air present in an internal space at an instrument panel is drawn and discharged to the outside of the cabin as a blower fan operates is formed in a ventilation mode without forming an air-conditioning flow path for blowing inside air or outside air into the cabin and the air-conditioning flow path is formed without forming the ventilation flow path in a mode other than the ventilation mode.

14 Claims, 9 Drawing Sheets

AUTOMOTIVE VENTILATION APPARATUS AND AUTOMOTIVE VENTILATION METHOD

BACKGROUND OF THE INVENTION

1. Field of the Invention

The present invention relates to an automotive ventilation apparatus and an automotive ventilation method that may be adopted to ventilate a vehicle cabin where the temperature has risen.

2. Description of Related Art

As the temperature of the surface of the instrument panel rises in a vehicle left in the sun for an extended period of time in hot weather, the temperature behind the instrument panel and the temperature within the vehicle cabin also rise. A driver entering the vehicle in this state will experience discomfort. There is an apparatus known in the related art intended to spare the driver from such discomfort by cooling the air inside the cabin with a cooling unit and retaining the cool air near the driver's seat (see Japanese Laid Open Patent Publication No. 2003-237358).

SUMMARY OF THE INVENTION

However, the apparatus disclosed in the reference literature mentioned above does not achieve high cooling efficiency since the air within the cabin is cooled with a conventional cooling unit that is not designed to counter the adverse effect of a temperature increase attributable to the air inside the instrument panel.

It would be desirable to provide an automotive ventilation apparatus that comprises an air-conditioning flow path forming device that forms an air-conditioning flow path through which inside air or outside air is taken in and blown into a cabin as a blower fan operates, a ventilation flow path forming device that forms a ventilation flow path through which air having been present in a space behind an instrument panel is drawn and discharged to the outside of the cabin as the blower fan is engaged in operation, and a flow path switching device that forms a ventilation flow path without forming the air-conditioning flow path in a ventilation mode and forms the air-conditioning flow path without forming the ventilation flow path in a mode other than the ventilation mode.

It would also be desirable to provide an automotive ventilation apparatus that comprises an air-conditioning fan, an air-conditioning flow path forming member that forms an air-conditioning flow path through which inside air or outside air is taken in and guided to an outlet directly facing a space inside a cabin as the air-conditioning fan operates, a communication port that communicates between an internal space behind an instrument panel and the air-conditioning flow path located upstream of the air-conditioning fan, an air discharge flow path forming member that forms an air discharge flow path branching from the air-conditioning flow path located downstream of the air-conditioning fan and extends to the outside of the cabin, and a flow path switching device that opens both the communication port and the air discharge flow path and closes the air-conditioning path extending from the air-conditioning fan to the outlet in a ventilation mode and closes both the communication port and the air discharge flow path in a mode other than the ventilation mode.

It would be desirable to provide an automotive ventilation method in which a ventilation flow path, through which air in an internal space behind an instrument panel is discharged to the outside of a cabin as a blower fan operates is formed in a ventilation mode without forming an air-conditioning flow path for blowing inside air or outside air into the cabin, and the air-conditioning flow path is formed without forming the ventilation flow path in a mode other than the ventilation mode.

DETAILED DESCRIPTION OF PREFERRED EMBODIMENTS

First Embodiment

The following is an explanation of the automotive ventilation apparatus in the first embodiment, given in reference to FIGS. 1 through 6.

Figure 1:
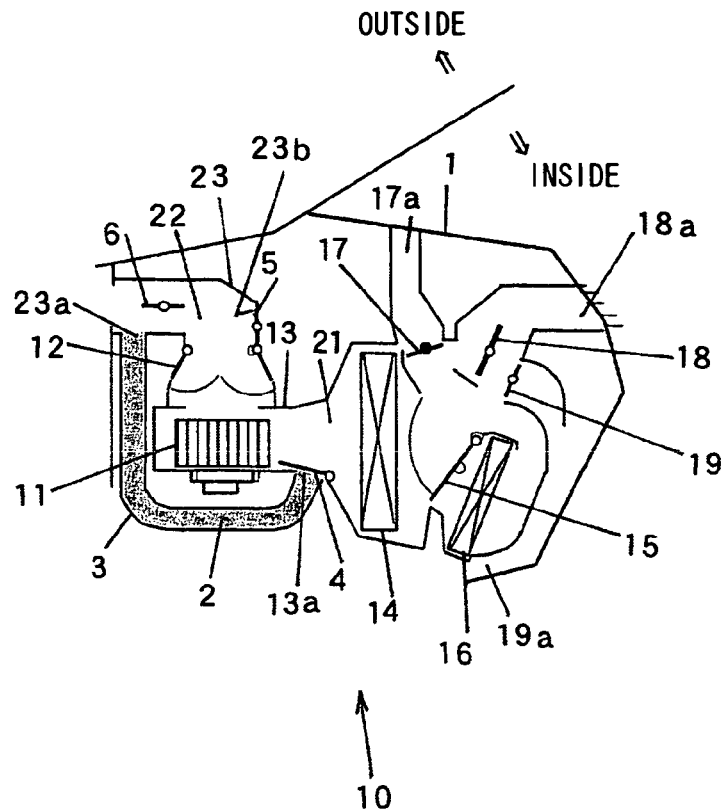
FIG. 1 schematically shows the structure adopted in the automotive ventilation apparatus in a first embodiment.

FIG. 1 schematically shows the structure adopted in the automotive ventilation apparatus in the first embodiment. An air-conditioning system 10 that controls the air condition inside the cabin is disposed inside an instrument panel 1 located at the front of the vehicle. The air-conditioning system 10 is utilized as a ventilation apparatus for ventilating the cabin while the vehicle is unoccupied.

The structure adopted in the air-conditioning system 10 is now explained. The air-conditioning system 10 includes a blower fan 11. As the blower fan 11 rotates, inside air or outside air is taken into an air-conditioning unit 13 via an inside air/outside air switching door 12. The air having been taken in is first cooled through an evaporator 14 and then passes through a heater core 16 at a rate corresponding to the degree of openness of an air mix door 15. The air that becomes heated as it passes through the heater core 16 and the air that is not heated as it passes through the heater core 16 are mixed and thus, a current of air that has been conditioned to a specific temperature is generated.

The conditioned air current is let out into the cabin from outlets opening via outlet doors. The outlet doors include a defogger door 17, a vent door 18 and a foot door 19. A defogger outlet 17a, a vent outlet 18a and a foot outlet 19a are provided respectively in correspondence to the defogger door 17, the vent door 18 and the foot door 19. The various outlet doors 17 through 19 are each opened/closed in correspondence to the air-conditioning mode. An air-conditioning flow path is formed inside the air-conditioning unit 13 as described above.

One end of a pipe member 3 is connected via a communication port 13a to the air-conditioning unit 13 disposed at a position directly downstream relative to the blower fan 11. The other end of the conduit member 3 is connected via a communication port 23a to an air drawing duct 23 that forms an outside air intake passage 22. The conduit member 3 forms an air discharge passage 2 extending from an air passage 21 located downstream relative to the blower fan to the outside air intake passage 22 located upstream relative to the blower fan. It is to be noted that a position downstream relative to the blower fan is a position in the path of airflow that is downwind of the position of the blower fan, whereas a position upstream relative to the blower fan is a position that is upwind of the blower fan.

An open/close door 4 is disposed between the air passage 21 located upstream relative to the evaporator and the air discharge passage 2. The open/close door 4 is structured so that when it is opened, the air passage 21 located downstream relative to the communication port 13a is closed (see FIG. 4). A communication port 23b is disposed at a position downstream relative to the communication port 23a at the air drawing duct 23, so as to open directly into the space behind the instrument panel. The communication port 23b can be opened/closed by an open/close door 5. At the outside air intake passage 22 between the communication port 23a and the communication port 23b, a switching door 6 used to switch from inside air intake to outside air intake and vice versa is disposed.

Figure 2:
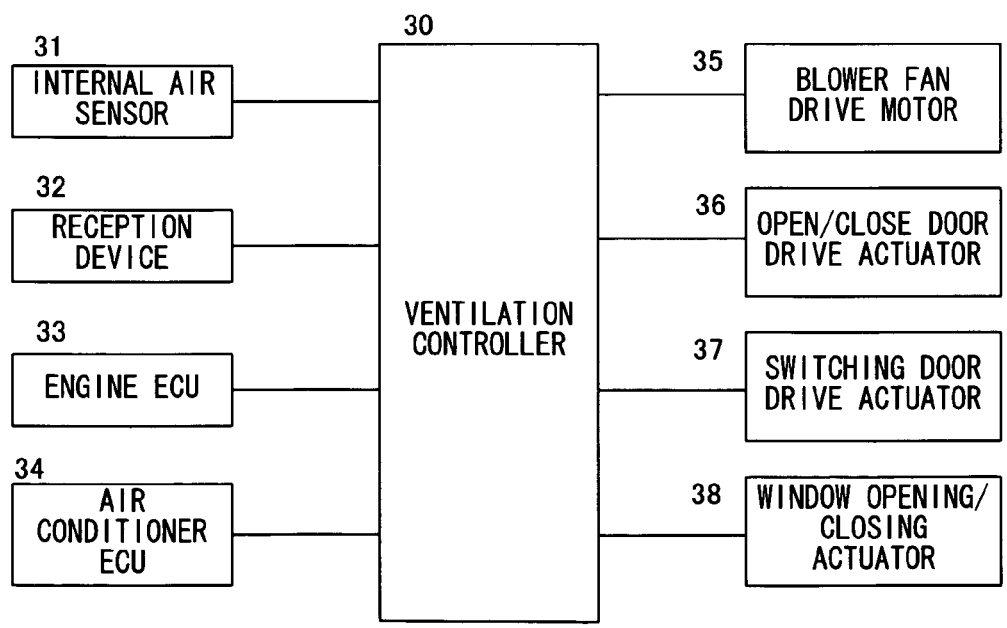
FIG. 2 is a block diagram showing the control structure of the automotive ventilation apparatus in the first embodiment.

FIG. 2 is a block diagram of the control structure adopted in the automotive ventilation apparatus in the first embodiment. An internal air sensor 31, a reception device 32, an engine ECU 33 and an air conditioner ECU 34 are all connected to a Ventilation controller 30. The internal air sensor 31 detects the temperature inside the cabin. The reception device 32 receives a ventilation start signal originating from a location outside the cabin. The engine ECU 33 outputs engine on/off signals. The air conditioner ECU 34 outputs air-conditioner on/off signals.

The ventilation start signal is transmitted from the car key (e.g., a smart key, an intelligent key or a remote-control key) together with a door lock-release command signal. The ventilation start signal indicates that the driver is approaching the vehicle or that the driver intends to enter the vehicle soon. The reception device 32 receives the ventilation start signal originating from the car key and then transmits the received ventilation start signal to the ventilation controller 30. Upon receiving the ventilation start signal from the reception device 32, the ventilation controller 30 executes ventilation processing to be detailed later.

Figure 3:
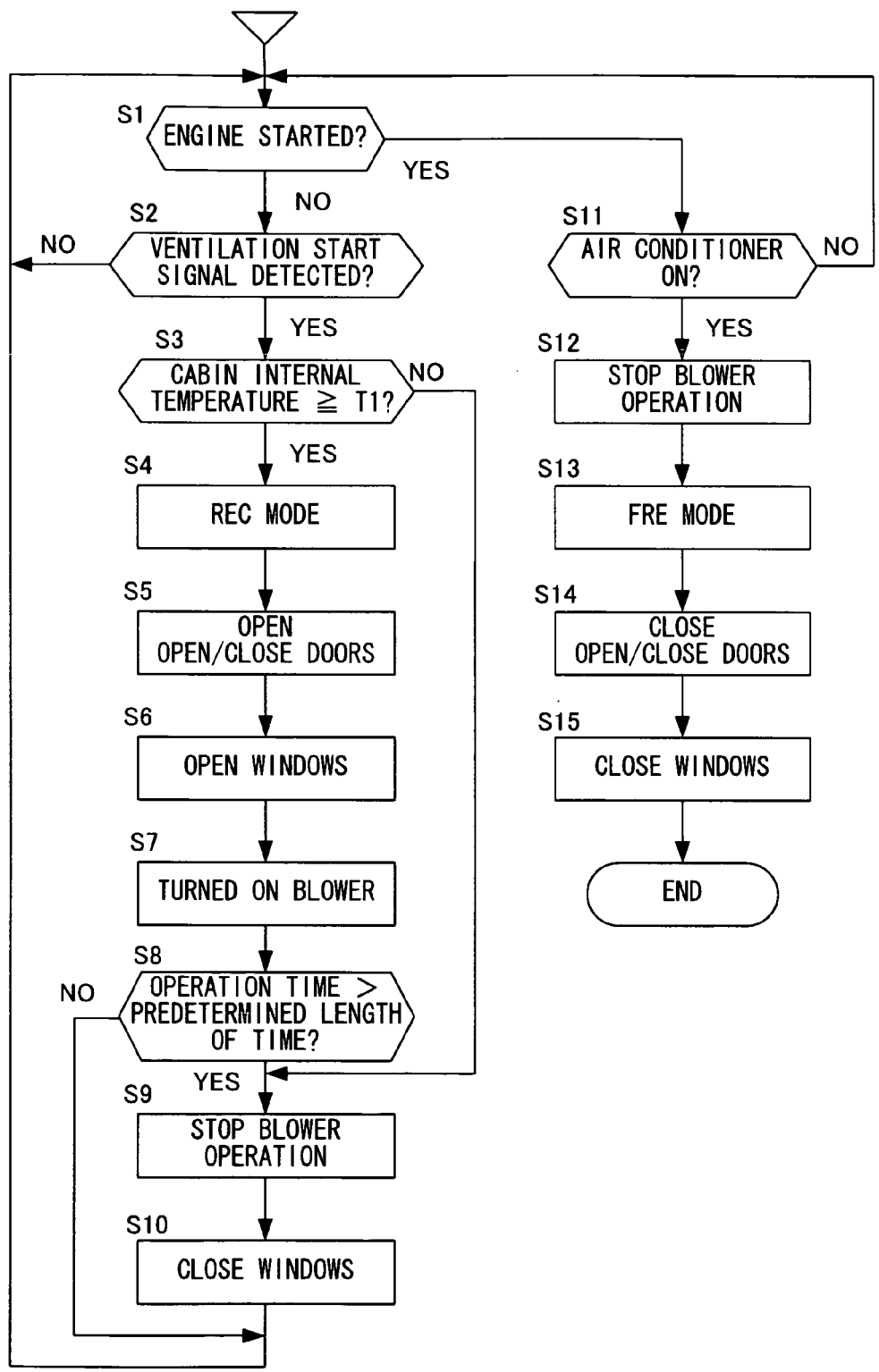
FIG. 3 presents a flowchart of an example of processing that may be executed by the ventilation controller shown in FIG. 2.

FIG. 3 presents a flowchart of an example of processing that may be executed by the ventilation controller 30. In step S1, a decision is made based upon a signal input from the engine ECU 23 as to whether or not the engine has been started. If it is decided that the engine has not been started, the operation proceeds to step S2. In step S2, a decision is made as to whether or not a ventilation start signal has been input from the reception device 22. If it is decided that no ventilation start signal has been input, the operation returns to step S1, whereas if it is decided that a ventilation start signal has been input, the operation proceeds to step S3.

In step S3, a decision is made as to whether or not the cabin internal temperature detected by the internal air sensor 31 is equal to or higher than a predetermined temperature T1 (e.g., 50° C.). The predetermined temperature T1 should be set to a level at which the driver entering the vehicle will find the cabin uncomfortably warm and stuffy to an extent requiring ventilation. If it is decided that the cabin internal temperature is equal to or higher than the predetermined temperature T1, the operation proceeds to step S4, whereas the operation proceeds to step S9 if the cabin internal temperature is judged to be lower than the predetermined temperature T1.

Figure 4:
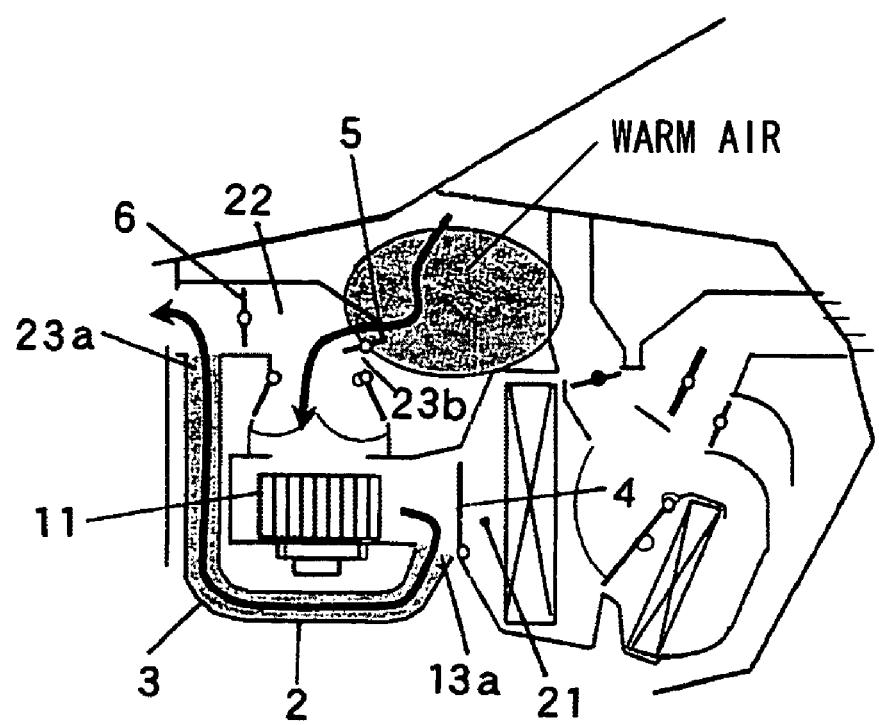
FIG. 4 illustrates the ventilation operation executed by the automotive ventilation apparatus in the first embodiment.

In step S4, a control signal for switching the air-conditioning mode to an inside air intake mode (REC mode) is output to a switching door drive actuator 37. The inside air intake mode is selected to guide cabin air into the air-conditioning unit 13. FIG. 4 shows the flow of the air achieved in the inside air intake mode. The switching door drive actuator 37 controls the position of the switching door 6 in order to close the outside air intake passage 22.

In step S5, following step S4, a control signal for simultaneously opening the open/close doors 4 and 5 is output to an open/close door drive actuator 36. In response to the control signal thus received, the open/close door drive actuator 36 opens the open/close doors 4 and 5. As a result, the communication port 23b becomes opened, the air discharge passage 3 becomes opened and the air passage 2 located upstream of the evaporator 14 becomes closed. Thus, a ventilation path (see the arrow in FIG. 4) extending from the space behind the instrument panel to the outside of the cabin via the blower fan 11 and the air discharge passage 2 is formed.

Figure 5:
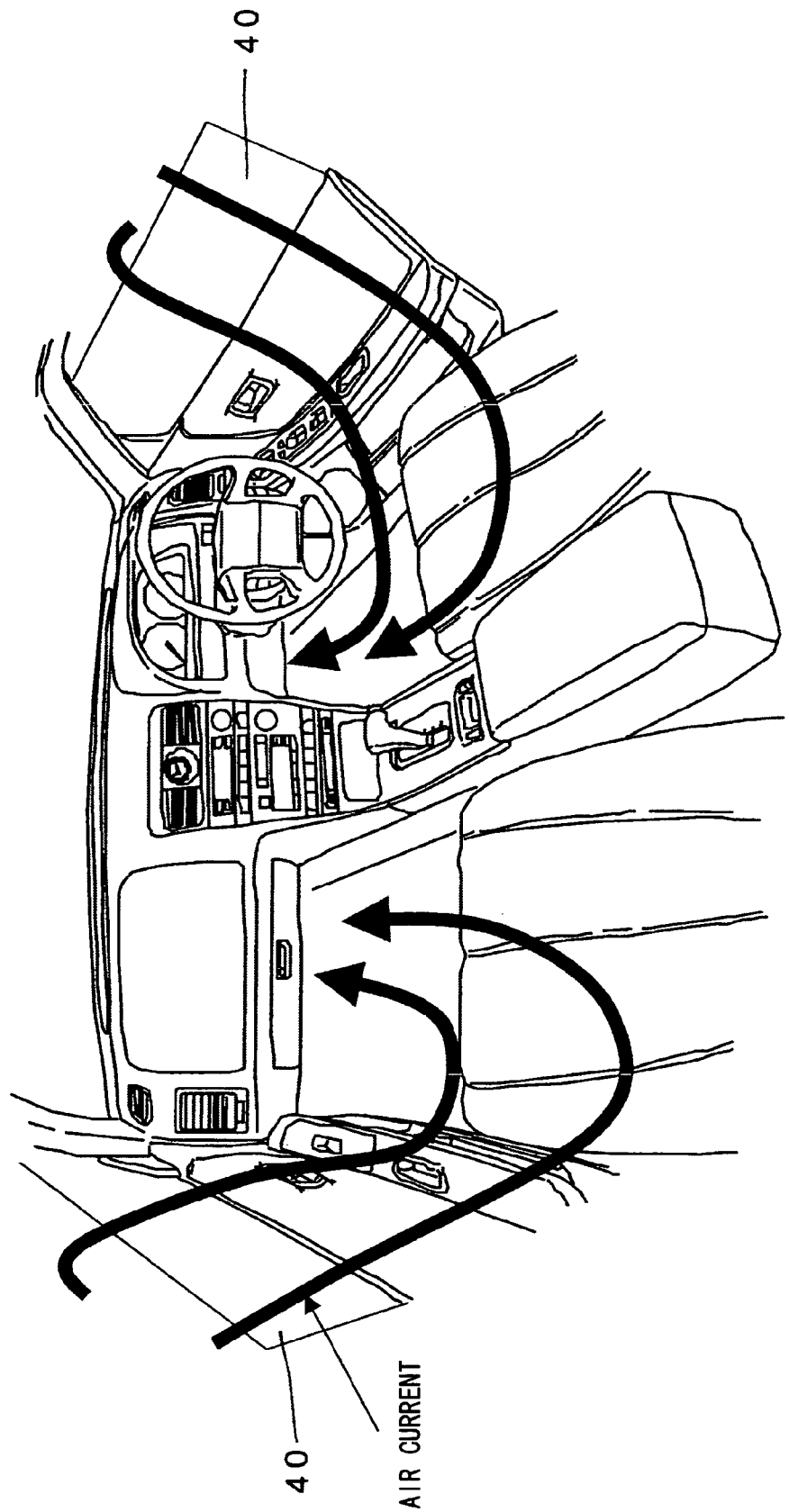
FIG. 5 shows how the outside air may be taken in through the side windows.

In step S6, following step S5, a control signal for opening side windows 40 to a predetermined extent is output to a window opening/closing actuator 38. Upon receiving the control signal, the window opening/closing actuator 38 opens the side windows 40 to the predetermined extent. FIG. 5 shows how the air flows when the side-windows 40 are open to the predetermined extent. As the side windows 40 are opened, outside air is allowed to flow into the cabin. It is to be noted that the side windows 40 should be opened by approximately 5 mm through 100 mm so as to create an airflow along the side windows 40, as shown in FIG. 5.

In step S7 following step S6, a control signal for activating the blower fan 11 is output to a blower fan drive motor 35. In response to the control signal thus received, the blower fan drive motor 35 starts the blower fan 11. As a result, the air inside the cabin is taken into the instrument panel 1 and, at the same time, the air having been present behind the instrument panel is discharged to the outside of the cabin via the air discharge passage 2.

In step S8 following step S7, a decision is made as to whether or not the blower fan 11 has been engaged in operation for a length of time greater than a predetermined time length t1. The predetermined time length t1 used to make a decision as to whether or not the operation of the blower fan 11 should end may be set to, for instance, approximately 30 seconds to 5 minutes. In consideration of more economical utilization of the available voltage in the battery, it is more desirable to set the predetermined time length t1 to 30 seconds to 2 minutes. It is to be noted that the cabin internal temperature can be significantly lowered by ventilating the cabin for approximately 1 minute under normal circumstances.

If it is decided in step S8 that the blower fan 11 has not been engaged in operation for a length of time exceeding the predetermined time length t1, the operation returns to step S1, whereas if it is decided that the blower fan 11 has been engaged in operation for a length of time greater than the predetermined time length t1, the operation proceeds to step S9. In step S9, a control signal for stopping the blower fan 11 is output to the blower fan drive motor 35. Upon receiving the control signal, the blower fan drive motor 35 stops the blower fan 11.

In step S10 following step S9, a control signal for closing the side windows 40 is output to the window opening/closing actuator 38. In response to the control signal thus received, the window opening/closing actuator 38 closes the side windows 40. Once the processing in step S10 ends, the operation returns to step S1.

If, on the other hand, it is decided in step S1 that the engine has been started, the operation proceeds to step S11. In step S11, a decision is made as to whether or not the air conditioner has been turned on, i.e., whether or not the user has issued an air-conditioning operation command, based upon a signal input from the air conditioner ECU 33. If it is decided that the air conditioner has not been turned on, the operation returns to step S1, whereas if it is decided that the air conditioner has been turned on, the operation proceeds to step S12.

In step S12, a control signal for temporarily stopping the operation of the blower fan 11 while the operation shifts into regular air-conditioning control is output to the blower fan drive motor 35. In response to the control signal thus received, the blower fan drive motor 35 stops the blower fan 11.

In step S13, following step S12, a control signal for switching the air-conditioning mode to an outside air intake mode (FRE mode) is output to the switching door drive actuator 37. The outside air intake mode is selected to guide outside air into the air-conditioning unit 13. The switching door drive actuator 37 controls the position of the switching door 6 in order to open the outside air intake passage 22.

In step S14, following step S13, a control signal for closing the individual open/close doors 4 and 5 is output to the open/close door drive actuator 36. Upon receiving the control signal, the open/close door drive actuator 36 closes both open/close doors 4 and 5. As a result, the ventilation path becomes cut off, thereby forming an air-conditioning path.

In step S15 following step S14, a control signal for closing the side windows 40 is output to the window opening/closing actuator 38. In response to the control signal thus received, the window opening/closing actuator 38 closes the side windows 40. Once the processing in step S15 ends, the ventilation processing ends.

It is to be noted that following the ventilation processing, regular air-conditioning control is executed. Namely, the blower fan 11 is engaged in operation to achieve a target temperature or the like, and the inside air/outside air switching door 12 is switched to open/close the outlet doors 17 through 19. This aspect of the control is not explained in detail.

The primary operation of the automotive ventilation apparatus in the first embodiment is now explained. If the vehicle is left outdoors over an extended period of time in hot weather, the cabin internal temperature rises to a level equal to or higher than the predetermined temperature t1 (50° C.) due to solar radiation. As the ventilation start signal is transmitted together with the door lock-release signal from the car key in this state, the outside air intake passage 22 is closed, the communication port 23b and the air discharge passage 2 are opened and the air passage 21 is closed, as shown in FIG. 4 (steps S4 and S5). Thus, the ventilation path extending from the space behind the instrument panel 1 to the outside of the cabin is formed (ventilation mode).

In this state, the side windows 40 are opened and the blower fan 11 is started up (steps S6 and S7). As a result, the outside air is taken into the cabin via the windows 40 and the air having been taken in then flows along the windows 40, the trim and the seats to flow into the inside of the instrument panel 1 from the bottom thereof, as shown in FIG. 5. The air behind the instrument panel is drawn via the communication port 23b and is discharged to the outside via the air discharge passage 2, as shown in FIG. 4.

In this ventilation method, the air at high temperature having stagnated behind the instrument panel is drawn by the blower fan 11 to lower the temperature of the air behind the instrument panel and the temperature at the surface of the instrument panel with priority. Thus, the cabin internal temperature can be lowered efficiently. In addition, since the air flows along the windows 40 and the seats, the temperature at the surfaces of the windows and the seats can be lowered effectively.

Figure 6:
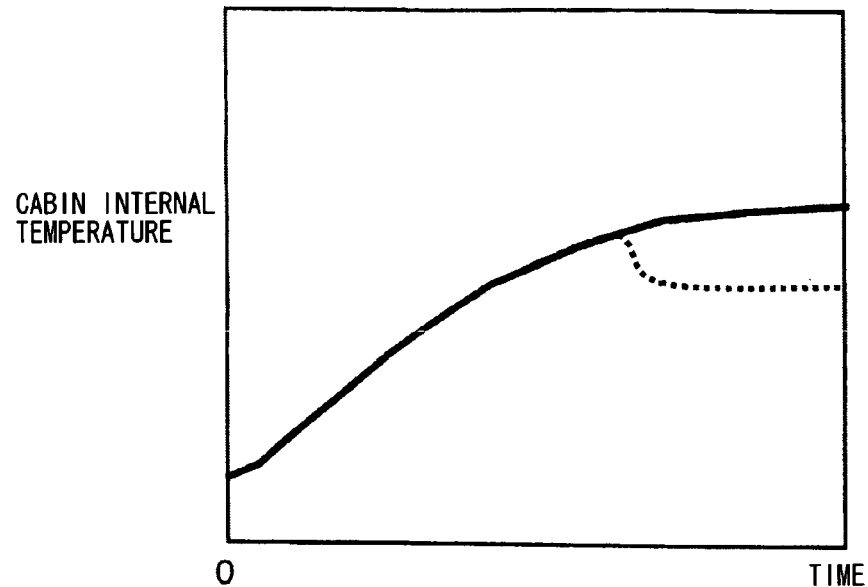
FIG. 6 is a diagram of the temperature lowering effect achieved with the automotive ventilation apparatus in the first embodiment.

FIG. 6 is a diagram of the change (dotted line) of the cabin internal temperature achieved by executing the ventilation operation with the automotive ventilation apparatus in the embodiment and the change (solid line) in the cabin internal temperature observed without executing any ventilation operation. As shown in FIG. 6, by executing the ventilation operation, the cabin internal temperature is greatly reduced compared to the temperature observed when no ventilation operation is executed.

When the predetermined length of time t1 elapses after the blower fan 11 is turned on, the operation of the blower fan 11 is stopped and the side windows 40 are closed (steps S9 and S10). Since the cabin internal temperature will have been lowered by a sufficient extent by this time, the driver entering the vehicle is not subjected to any discomfort. Since the temperature at the surface of the steering wheel disposed near the instrument panel 1 will have been lowered as well, the driver is able to start steering immediately after getting into the vehicle.

As the driver having entered the vehicle starts the engine and turns on the air-conditioner switch, the outside air intake passage 22 is opened, the communication port 23b and the air-discharge passage 2 are closed and the air passage 21 is opened, as shown in FIG. 1 (steps S13 and S14). Thus, the ventilation path becomes closed and the air-conditioning passage becomes opened (regular air-conditioning mode). As a result, the inside air or the outside air taken in via the inside air/outside air switching door 12 is allowed to flow to the outlets 17a through 19a, thereby enabling a regular air-conditioning operation. In this situation, the cabin internal temperature is already lowered through the earlier ventilation operation and thus, the temperature inside the cabin can be lowered to the target temperature quickly.

If the driver starts up the engine and turns on the air-conditioner switch before the predetermined length of time elapses after the blower fan 11 is turned on, i.e., before the blower fan 11 stops, the doors 4 through 6 are driven after temporarily stopping the operation of the blower fan 11 (steps S12 through S14). Thus, the doors 4 through 6 are not driven against the flow of the air, which allows the flow path to be switched with ease.

The following advantages are achieved in the automotive ventilation apparatus in the first embodiment.

(1) The air discharge passage 2 is formed to extend from the downstream side of the blower fan 11 through the outside air intake passage 22, the communication port 23b is disposed so as to communicate between the upstream side of the blower fan 11 and the space behind the instrument panel, and the air behind the instrument panel is drawn via the communication port 23b by driving the blower fan 11 in the ventilation mode to discharge the air thus drawn to the outside of the cabin via the air discharge passage 2. As a result, the temperature of the air behind the instrument panel can be lowered with priority and the cabin internal temperature can be lowered with a high level of efficiency.

(2) Since the cabin is ventilated with the blower fan 11 included in the air-conditioning system 10, it is not necessary to provide a special fan to be exclusively used for ventilation, and thus, the cost can be minimized.

(3) The open/close door 4 is used to open the air discharge passage 2 by closing the air-conditioning passage 21 in the ventilation mode and to close the air discharge passage 2 by opening the air-conditioning passage 21 in a mode other than the ventilation mode. This eliminates the need to provide separate doors in correspondence to the air-conditioning passage 21 and the air discharge passage 2 respectively and thus, the number of required parts does not need to increase.

(4) The switching door 6 is used to close the outside air intake passage 22 to stop the inflow of the outside air. Also, the air discharge passage 2 is made to communicate with the outside air intake passage 22 to discharge the air having been present behind the instrument panel. Thus, it is not necessary to extend the air discharge passage 22 to the outside of the cabin, thereby saving component installation space.

(5) During the ventilation operation, the side windows 40 are opened to a predetermined extent to take outside air into the cabin and thus, the internal environment in the cabin is never set in a negative pressure state. As a result, the doors can be opened with ease.

(6) As the side windows 40 are opened, outside air is taken in through the upper portions of the side windows 40. As a result, the temperature of the air around the driver's face, which is the most sensitive part of the body, can be lowered with a high level of effectiveness.

(7) Since the space behind the instrument panel and the space inside the cabin communicate with each other under the bottom portion of the instrument panel 1, the air flows from the top of the side windows 40 toward the bottom of the instrument panel 1 in the cabin. Consequently, before the driver gets into the vehicle, the air is dispersed from the position corresponding to the driver's head toward the position corresponding to the driver's feet, which effectively minimizes the degree of discomfort experienced by the driver entering the vehicle.

(8) Since the side windows 40 are opened by approximately 5 to 100 mm, the outside air having been taken into the cabin flows along the side windows 40, the trim and the seats. As a result, the temperatures at the surfaces of the members such as the side windows, the trim and the seats can be lowered efficiently.

(9) The ventilation operation is executed when the engine is in an off state, the cabin internal temperature is equal to or higher than the predetermined temperature T1 and a ventilation start signal is detected. This means that no unnecessary ventilation is executed to ensure that the battery power is economically utilized.

(10) A ventilation start signal is received at the reception device 32 if a door lock-release command is transmitted from the car key or as an approach of the driver to the vehicle is detected before the driver actually gets into the vehicle, which eliminates the need for any complicated operation to be performed to issue a command for a ventilation operation.

Second Embodiment

Figure 7:
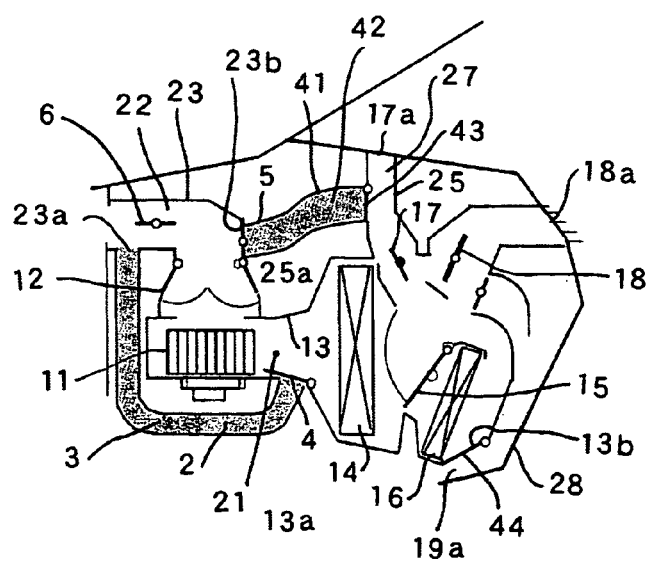
FIG. 7 schematically shows the structure adopted in the automotive ventilation apparatus in a second embodiment.
Figure 8:
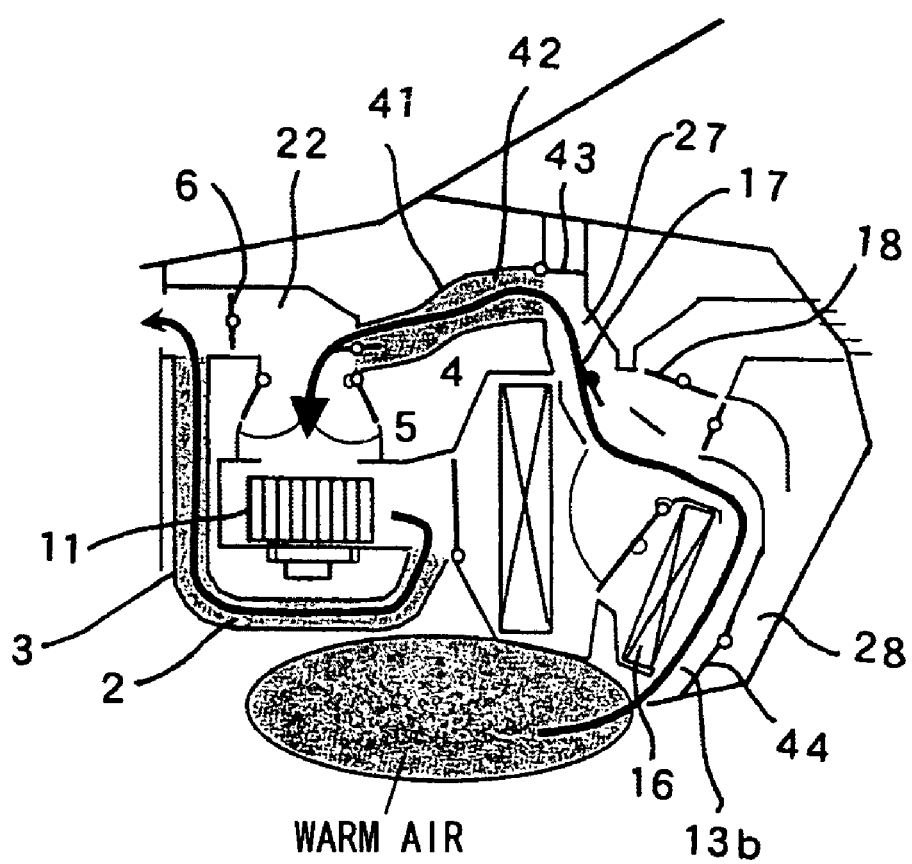
FIG. 8 illustrates the ventilation operation executed by the automotive ventilation apparatus in the second embodiment.

In reference to FIGS. 7 and 8, the automotive ventilation apparatus in the second embodiment is explained.

FIG. 7 schematically shows the structure adopted in the automotive ventilation apparatus in the second embodiment. It is to be noted that the same reference numerals are assigned to components identical to those in FIG. 1. The following explanation focuses on components different from those in FIG. 1. The air discharge passage 2 in the automotive ventilation apparatus in the first embodiment is formed so as to extend from the downstream side of the blower fan 11 to the outside air intake passage 22. The automotive ventilation apparatus in the second embodiment further includes an air discharge passage formed to extend from a defogger duct 25 toward the air drawing duct 23.

As shown in FIG. 7, one end of a conduit member 41 is connected via a communication port 25a to the defogger duct 25 with the other end of the conduit member 41 connected to the air drawing duct 23 via a communication port 23b. As a result, an air discharge passage 42 extending from an air passage 27 within the defogger duct 25 toward the upstream side of the blower fan is formed. An open/close door 43 used to open/close the air discharge passage 42 (the communication port 25a) is disposed at the air passage 27. The open/close door 43 is structured so that the air passage 27 located downstream of the communication port 25a is closed when the open/close door is opened. In addition, a communication port 13b is formed as an opening at the air-conditioning unit 13 at a position downstream of the heater core so as to communicate with the inner space at the instrument panel 1. The communication port 13b is opened/closed by an open/close door 44. When the open/close door 44 is opened, an air passage 28 inside the foot duct is closed by the open/close door 44.

In the first embodiment, the open/close doors 4 and 5 are opened/closed by the open/close door drive actuator 36 in the ventilation mode. In the second embodiment, the open/close doors 43 and 44 as well as the open/close doors 4 and 5 are opened/closed in the ventilation mode. In addition, the vent door 18, too, is closed in the ventilation mode so as to prevent any air from being forced out into the cabin. Apart from these differences, the control structure adopted in the ventilation apparatus is identical to the structure shown in FIG. 2 and the details of the ventilation processing are also similar to those shown in FIG. 3.

During the ventilation operation, inside air is taken in by turning the switching door 6 in a specific direction to individually open the open/close doors 4, 5, 43 and 44 (step S5 in FIG. 3) in the second embodiment. In addition, the vent door 18 is closed as explained earlier. As a result, a ventilation path extending from the space behind the instrument panel to the blower fan 11 via the communication port 13b, the air passage 27 inside the defogger duct and the air discharge passage 41 is formed as shown in FIG. 8. In this state, the side windows 40 are opened and the blower fan 11 is driven (steps S6 and S7), thereby expelling the air having been present behind the instrument panel to the outside of the cabin via the communication port 13b, the air discharge passage 42 and the air discharge passage 2, as indicated by the arrow in FIG. 8.

Following the ventilation operation, the switching door 6 is switched to the outside air intake and the open/close doors 4, 5, 43 and 44 are all closed (steps S13 and S14 in FIG. 3) as shown in FIG. 7. As a result, the ventilation path becomes cut off and the air-conditioning path is opened. Subsequently, the regular air-conditioning operation is executed to let out the inside air or the outside air drawn in by the blower fan 11 through the outlets 17a through 19a.

The automotive ventilation apparatus in the second embodiment includes the air discharge passage 42 formed to extend from the air passage 27 inside the defogger duct to the outside air intake passage 22 and the communication port 13b formed as an opening at a position further downstream relative to the heater core 16, so as to draw out the air behind the instrument panel via the communication port 13b and the air discharge passage 42. This allows the air behind the instrument panel to be drawn out, regardless of the position of the air drawing duct 23. Certain restrictions are bound to be imposed with regard to the position of the air drawing duct 23 when the air behind the instrument panel needs to be directly drawn through the communication port 23b, as in the first embodiment, since the opening of the communication port 23a needs to directly face the inner space behind the instrument panel 1 in order to draw the air efficiently. No such restrictions need to be imposed with regard to the position of the air drawing duct 23 when the second embodiment is adopted. In the structure adopted in the second embodiment, the air having been drawn does not pass through the evaporator 14 or the heater core 16, and thus, the extent of pressure loss is reduced and a sufficient flow rate of the drawn air is assured. In addition, since part of the passage inside the air-conditioning unit 13 is utilized as a ventilation path in the ventilation mode, the length of the passage that is exclusively used for ventilation is minimized to achieve better efficiency and space utilization.

Third Embodiment

Figure 9:
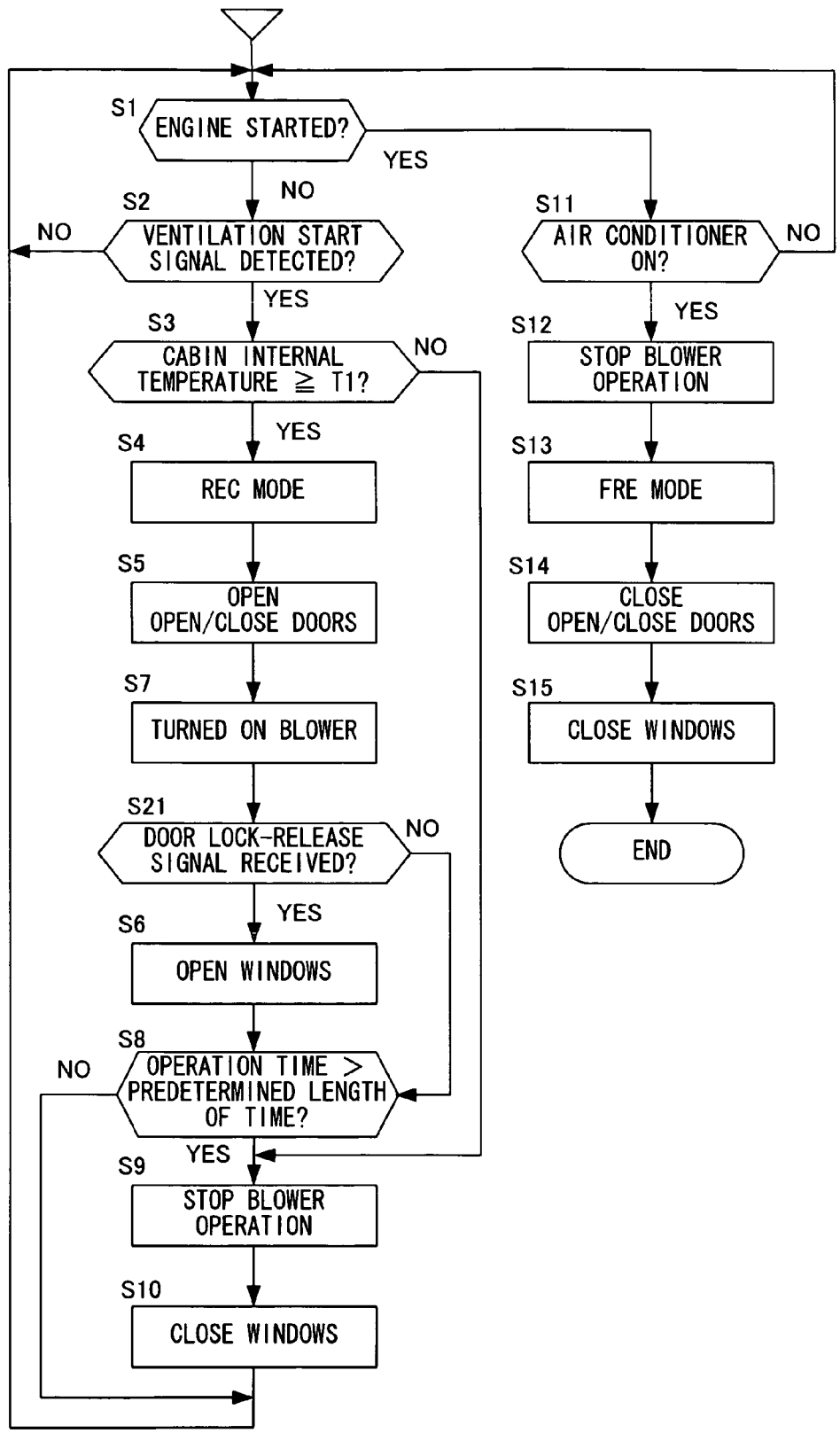
FIG. 9 presents a flowchart of an example of processing that may be executed by the ventilation controller in the automotive ventilation apparatus in a third embodiment.

In reference to FIG. 9, the automotive ventilation apparatus in the third embodiment is explained.

The following explanation focuses on the feature of the embodiment that differentiates it from the first embodiment. The automotive ventilation apparatus in the third embodiment differs from the automotive ventilation apparatus in the first embodiment in the processing executed by the ventilation controller 30. FIG. 9 presents a flowchart of an example of processing that may be executed by the ventilation controller 30 in the third embodiment. It is to be noted that the same step numbers are assigned to steps in which processing identical to that in FIG. 3 is executed.

After the open/close doors 4 and 5 are opened in step S5, the operation proceeds to step S7. In step S7, the blower fan 11 is turned on without opening the side windows 40. Once the blower fan 11 is engaged in operation, the operation proceeds to step S21.

In step S21, a decision is made as to whether or not the driver is approaching the vehicle. This decision may be made based upon, for instance, whether or not the reception device 32 has received a door lock-release signal. If it is decided that a door lock-release signal has been received, the operation proceeds to step S6.

In step S6, a control signal for opening the side windows 40 by a predetermined extent is output to the window opening/closing actuator 38. In response to the control signal thus received, the window opening/closing actuator 38 opens the side windows 40 by the predetermined extent. After the processing for opening the side windows 40 is executed, the operation proceeds to step S8. The ventilation operation is continuously executed until an affirmative decision is made in step S8 through this control.

If, on the other hand, it is decided in step S6 that no door lock-release signal has been received, the operation proceeds to step S8. In this case, the ventilation operation is continuously executed while the side windows 40 remain closed until an affirmative decision is made in step S8.

The automotive ventilation apparatus achieved in the third embodiment, which opens the windows 40 upon detecting an approach of the driver to the vehicle instead of opening the windows 40 at the start of the ventilation operation assures better protection against unauthorized entry.

Fourth Embodiment

The fourth embodiment of the automotive ventilation apparatus according to the present invention is now explained in reference to FIGS. 10 through 13.

Figure 10:
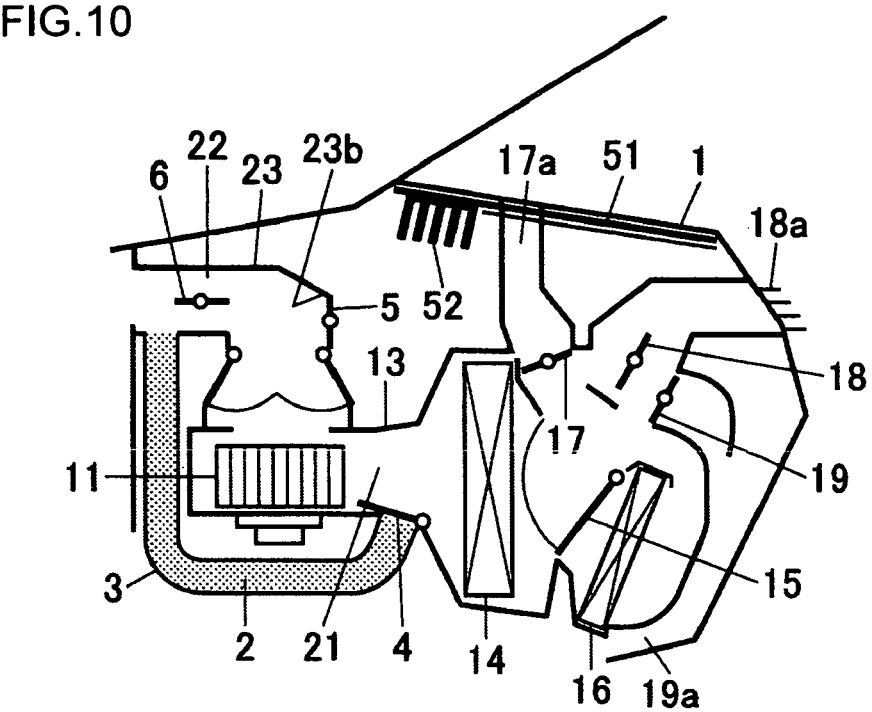
FIG. 10 schematically shows the structure adopted in the automotive ventilation apparatus in a fourth embodiment.
Figure 11:
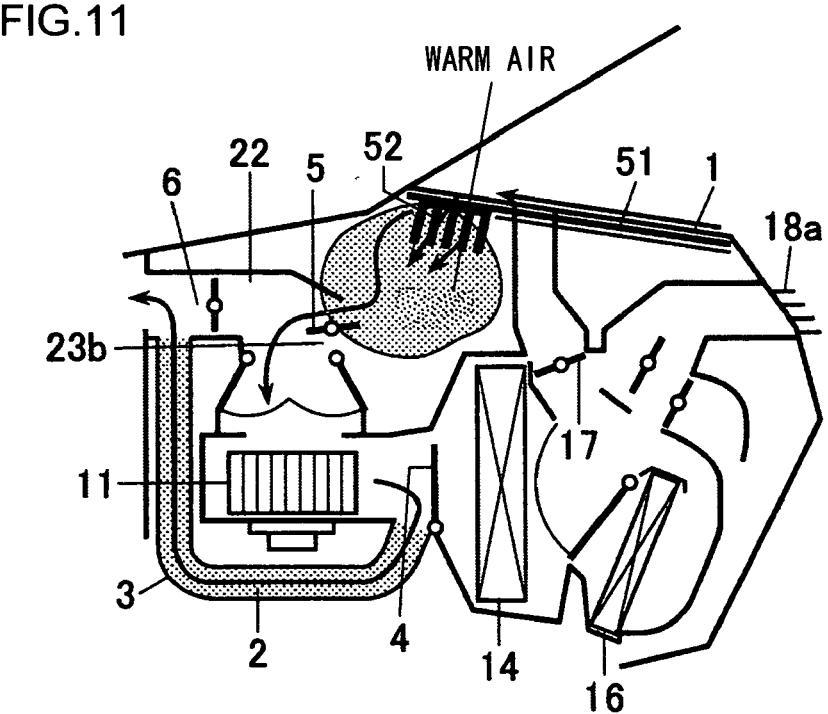
FIG. 11 illustrates the ventilation operation executed by the automotive ventilation apparatus in the fourth embodiment.

FIG. 10 schematically shows the structure adopted in the automotive ventilation apparatus in the fourth embodiment. The same reference numerals are assigned to components identical to those in FIG. 1. The following explanation focuses on components different from those in FIG. 1. The automotive ventilation apparatus in the fourth embodiment is characterized in that it includes a radiator used to discharge the heat at the instrument panel surface efficiently.

As shown in FIG. 10, a layered structure achieved by inserting a heat conducting plate 51 through insertion molding is adopted in the instrument panel 1. More specifically, the heat conducting plate 51 is inserted within the instrument panel top plate where the temperature rises greatly under intense sunlight. The heat conducting plate 51 is formed by using a material with good thermal conductivity (e.g., a metal, a carbon fiber or a compound material composed of metal and carbon fiber) and part of the heat conducting plate is exposed to the inner space behind the instrument panel 1 where air flows in the ventilation mode.

Figure 12:
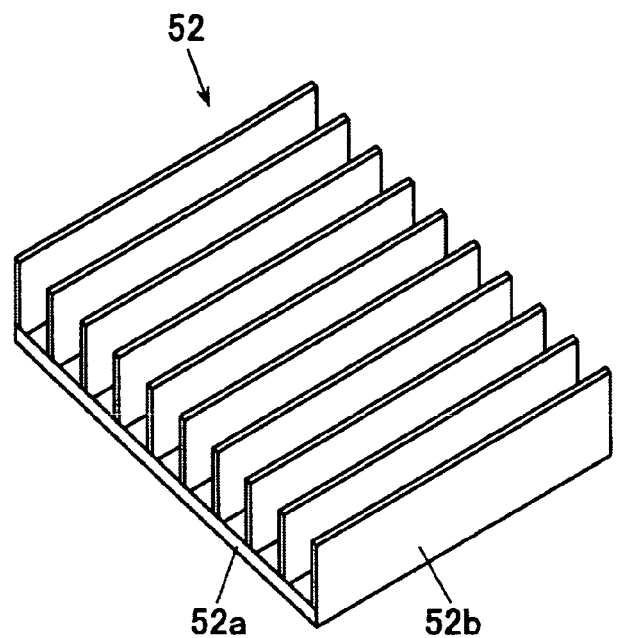
FIG. 12 is a perspective of the radiator shown in FIG. 10.

A radiator 52 is disposed at the exposed part of the heat conducting plate 51. FIG. 12 shows in detail the structure of the radiator 52. As shown in FIG. 12, the radiator 52 is a finned radiator that includes a plurality of radiating fins 52b projecting out from a base 52a. The base 52a is mounted at the heat conducting plate 51 with the surface of the base 52a set in contact with the heat conducting plate 51. Namely, the plurality of fins 52b project into the space behind the instrument panel.

As the temperature at the surface of the instrument panel 1 in the vehicle having been left outdoors rises, the heat from the instrument panel 1 is conducted to the heat conducting plate 51 and is stored at the heat conducting plate 51. As the ventilation operation starts in this state, the open/close doors 4 and 5 are opened, the windows 40 are opened and the blower fan 11 is driven (steps S5 through S7 in FIG. 3) as in the first embodiment. As a result, the air behind the instrument panel 1 is drawn into the air drawing duct 23 via the communication port 23b and then is discharged to the outside of the cabin via the air discharge passage 2, as indicated by the arrow in FIG. 11.

During this process, the air having been present behind the instrument panel now flowing along the fins 52b at the radiator 52, undergoes heat exchange at the surfaces of the fins 52b. As a result, the heat having been stored at the heat conducting plate 51 is released into the air via the base 52a and the fins 52b. The heat thus released is discharged to the outside of the cabin in the air flowing out of the cabin. Once the radiator 52 starts to release heat, the quantity of heat having been stored at the heat conducting plate 51 becomes reduced, causing more heat from the instrument panel 1 to be conducted to the heat conducting plate 51. Consequently, the temperature at the overall instrument panel can be effectively lowered, which ultimately allows the temperature inside the cabin to be lowered efficiently within a short period of time.

The automotive ventilation apparatus in the fourth embodiment includes the heat conducting plate 51 formed inside the instrument panel 1 through insertion molding and the radiator 52 disposed at part of the heat conducting plate 51. Thus, the heat from the instrument panel 1 is released into the inner space at the instrument panel 1 via the heat conducting plate 51 and the radiator 52, lowering the temperature at the instrument panel 1 promptly. The heat conducting plate 51 achieving higher thermal conductivity than the instrument panel 1 is formed through insertion molding so as to be enclosed inside the instrument panel 1 with lower thermal conductivity on the two sides thereof. As a result, the heat from the instrument panel 1 is allowed to flow along the heat conducting plate 51 to be released with a high level of efficiency from the radiator 52. If no such radiator is included, heat radiation is bound to occur over the entire heat conducting plate 51, which will lower the heat radiation efficiency.

By disposing the radiator 52 at a portion of the heat conducting plate 51 and allowing the heat of the instrument panel 1 to be conducted to the radiator 52 via the heat conducting plate 51, the temperature over the entire instrument panel can be efficiently reduced without having to supply air along the instrument panel 1. In addition, since the radiator 52 is disposed within the path of the air flowing behind the instrument panel, the radiator 52 achieves a high level of thermal conductivity and ultimately a high level of heat radiating efficiency. Since a plurality of fins projecting into the space behind the instrument panel 1 are formed at the radiator 52, the radiator 52 is allowed to contact the air over a larger contact area, which allows the heat received at the heat conducting plate 52 to be released efficiently through the radiator 52.

While the heat conducting plate 52 is formed inside the instrument panel 1 through insertion molding in the fourth embodiment, a heat conducting plate adopting a structure other than that described above may be used, as long as it conducts the heat from the instrument panel 1 to the radiator 52. For instance, the instrument panel 1 may be bonded to the heat conducting plate 51 on the two sides thereof to achieve a layered structure. Alternatively, a radiator 52 may be disposed at the instrument panel which does not include a heat conducting plate. While the radiator 52 is disposed at an end of the heat conducting plate 51 in the embodiment, it may be disposed at the center of the heat conducting plate 51 instead. In any case, it is desirable to dispose the radiator 52 at a position where the maximum thermal conductivity is achieved.

Figure 13:
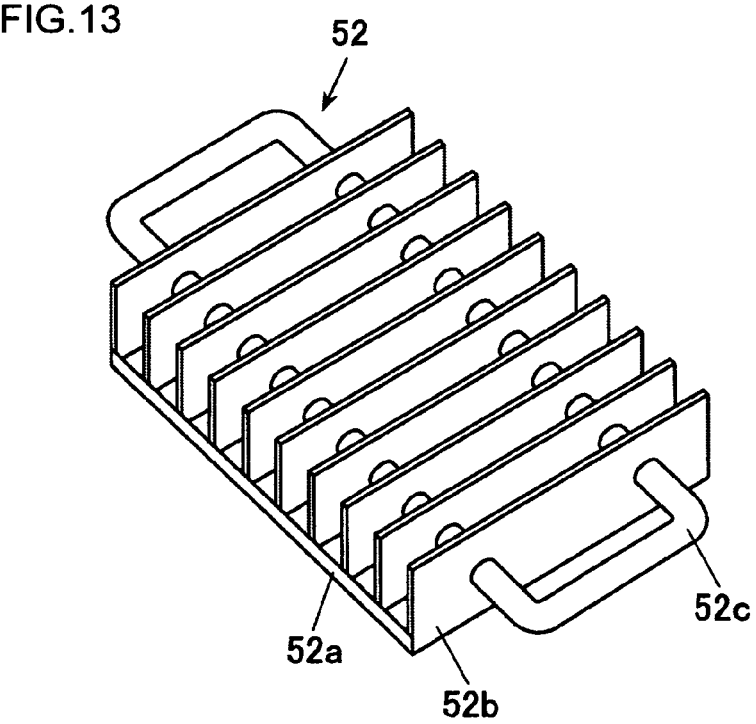
FIG. 13 presents an example of a structure that may be adopted in a variation of the radiator.

It is desirable to dispose the radiator 52 at a position along the flow of the air behind the instrument panel in the ventilation mode. The radiator may adopt a structure other than that of the plate-type finned radiator described above. For instance, individual fins 52b may be connected with one another via a heat pipe 52c, as shown in FIG. 13. The structure shown in FIG. 13 achieves uniformity in the temperature at the fins 52b, which allows the heat to be released uniformly through the individual fins 52b so as to maximize the performance of the radiator 52. Alternatively, the radiator 52 may be a finless radiator, e.g., a blade type radiator with a heat pipe 52c mounted at the base 52a.

While the communication port 23b is formed at the air drawing duct 23 to draw the air behind the instrument panel in the structure shown in FIG. 4, the air having been present behind the instrument panel may be drawn through the inside air intake port by switching the inside air/outside air switching door 12 to inside air intake if the inside air intake port at the air-conditioning system 10 directly faces the internal space behind the instrument panel. In addition, while the air having been present in the instrument panel is drawn through the communication port 13b disposed further downstream relative to the heater core 16 in the structure shown in FIG. 8, the communication port 13b may be disposed at another position. Namely, the ventilation passage may adopt a structure other than those described above, as long as the air present in the internal space at the instrument panel 1 is drawn and discharged to the outside of the cabin through the operation of the blower fan 11. For instance, a path forming member other than the conduit member 3 or 41 may be used. In short, the ventilation path forming means may adopt any structure. Furthermore, the air-conditioning system 10 used as an air-conditioning path forming member with which the air-conditioning path is formed may adopt a structure other than that described above. In short, the air-conditioning path forming means may adopt any structure.

A small exhaust fan with a relatively low power requirement to achieve a given flow rate of drawn air may be used in place of the blower fan 11. While the air discharge passage 2 is made to communicate with the outside air intake passage 22 so as to discharge the air from the air discharge passage 2 to the outside of the cabin via the outside air intake passage 22, the air may instead be discharged to the outside of the cabin without traveling through the outside air intake passage 22. Namely, the air discharge path does not need to be formed with the air discharge passage 2 and the outside air intake passage 22, and the air discharge path forming member may adopt a structure other than that described above.

A first open/close member, i.e., the open/close door 5, is used to open/close the communication port 23b, a second open/close member, i.e., the open/close door 4, is used to open/close the air discharge passage 2, and a third open/close member, i.e., the switching door 6, is used to open/close the outside air intake passage 22. These doors may be disposed in an arrangement other than that described above. While the air passage 21 is closed by the open/close door 4, a separate passage open/close member may be used exclusively to open/close the air passage extending from the blower fan 11 to the outlets 17a through 19a. While the paths are switched by using the switching door 6 and the open/close doors 4 and 5, 43 and 44, the flow path switching means may adopt a structure other than that described above, as long as the communication port 23b and the air discharge passage 2 are opened and the air passage 21 is closed in the ventilation mode and the communication port and the air discharge passage 2 are closed in a mode other than the ventilation mode (e.g., the regular air-conditioning mode). A structure other than that shown in FIG. 2 may be adopted in the control means of the ventilation apparatus.

While the driver's intent to enter the car is detected by receiving at the reception device 22 a ventilation start signal originating from the car key in the first embodiment, the driver's intent to enter the vehicle may be detected by adopting another method. For instance, a ventilation start signal originating from a communication terminal such as a portable telephone or a PHS carried by the driver may be received at the reception device 22.

While a single actuator 36 simultaneously drives the open/close doors 4 and 5 connected via a link mechanism or the like, the open/close doors 4 and 5 may be driven by separate actuators, instead.

The disclosures of the following priority applications are herein incorporated by reference:

Japanese Patent Application No. 2005-57722 filed Mar. 2, 2005,

Japanese Patent Application No. 2005-110767 filed Apr. 7, 2005.

What is claimed is:
1. An automotive ventilation apparatus comprising:
an air-conditioning fan;

an inside air intake port configured to take in an inside air and located upwind of the air-conditioning fan when the air-conditioning fan operates;

an outside air intake port configured to take in an outside air and located upwind of the inside air intake port when the air-conditioning fan operates;

an air-conditioning flow path forming member that forms an air-conditioning flow path through which the inside air via the inside air intake port or the outside air via the outside air intake port is taken in and guided to an outlet directly facing a space inside a cabin when the air-conditioning fan operates, the outlet being located downwind of the air-conditioning fan when the air-conditioning fan operates;

a first switching member configured to switch between a first state in which the inside air taken in via the inside air intake port is led to the air-conditioning flow path and a second state in which the outside air taken in via the outside air intake port is led to the air-conditioning flow path;

a communication port located on the air-conditioning flow path forming member upwind of the air-conditioning fan and between the inside air intake port and the outside air intake port when the air-conditioning fan operates, and directly facing an internal space behind an instrument panel, the instrument panel comprising external surfaces facing towards the cabin and internal surfaces opposing the external surfaces, the internal space comprising a volume being bordered by the internal surfaces and fluidly communicating directly with the air-conditioning flow path by the communication port;

an open/close member configured to open and close the communication port;

an air discharge flow path forming member that forms an air discharge flow path branching from the air-conditioning flow path located downwind of the air-conditioning fan when the air-conditioning fan operates and extends to outside of the cabin; and a second switching member configured to switch between a third state in which an air flow located downwind of the air-conditioning fan when the air-conditioning fan operates is led to the air discharge flow path and a fourth state in which the air flow located downwind of the air-conditioning fan when the air-conditioning fan operates is led to an air passage extending from the air-conditioning fan to the outlet, wherein, in a ventilation mode, the communication port is configured to be opened by the open/close member and the second switching member is configured to be in the third state, wherein, in a mode other than the ventilation mode, the communication port is configured to be closed by the open/close member and the second switching member is configured to be in the fourth state.

2. An automotive ventilation apparatus according to claim 1, further comprising:

a control device configured to control the open/close member to open the communication port and to control the second switching member to achieve the third state in the ventilation mode and configured to control the open/close member to close the communication port and to control the second switching member to achieve the fourth state in the mode other than the ventilation mode.

3. An automotive ventilation apparatus according to claim 1, wherein the communication port is configured such that an upper portion of the internal space behind the instrument panel fluidly communicates with the air-conditioning flow path located upwind of the air-conditioning fan.

4. An automotive ventilation apparatus according to claim 1, wherein the communication port is configured such that a lower portion of the internal space behind the instrument panel fluidly communicates with the air-conditioning flow path located upwind of the air-conditioning fan.

5. An automotive ventilation apparatus according to claim 1, further comprising a radiator configured to release heat at the instrument panel into the internal space behind the instrument panel.

6. An automotive ventilation apparatus according to claim 5, wherein the instrument panel comprises a heat conducting plate enclosed therein; and wherein the radiator is configured to release heat having been guided thereto via the heat conducting plate into the internal space behind the instrument panel.

7. An automotive ventilation apparatus according to claim 5, wherein the radiator comprises a plurality of fin members disposed at a surface thereof.

8. An automotive ventilation apparatus according to claim 1, wherein the air-conditioning fan is a blower fan used for air-conditioning.

9. An automotive ventilation apparatus comprising:

an air-conditioning fan;

an inside air intake port configured to take in an inside air and located upwind of the air-conditioning fan when the air-conditioning fan operates;

an outside air intake port configured to take in an outside air and located upwind of the inside air intake port when the air-conditioning fan operates;

an air-conditioning flow path forming member that forms an air-conditioning flow path through which the inside air via the inside air intake port or the outside air via the outside air intake port is taken in and guided to an outlet directly facing a space inside a cabin when the air-conditioning fan operates, the outlet being located downwind of the air-conditioning fan when the air-conditioning fan operates;

a switching member configured to switch between a first state in which the inside air taken in via the inside air intake port is led to the air-conditioning flow path and a second state in which the outside air taken in via the outside air intake port is led to the air-conditioning flow path;

a communication member located on the air-conditioning flow path forming member upwind of the air-conditioning fan and between the inside air intake port and the outside air intake port when the air-conditioning fan operates, and directly facing an internal space behind an instrument panel, the instrument panel comprising external surfaces facing towards the cabin and internal surfaces opposing the external surfaces, the internal space comprising a volume being bordered by the internal surfaces and fluidly communicating directly with the air-conditioning flow path by the communication member;

an open/close member configured to open and close the communication member;

an air discharge flow path forming member that forms an air discharge flow path branching from the air-conditioning flow path located downwind of the air-conditioning fan when the air-conditioning fan operates and extends to outside of the cabin;

a second switching member configured to switch between a third state in which an air flow located downwind of the air-conditioning fan when the air-conditioning fan operates is led to the air discharge flow path and a fourth state in which the air flow located downwind of the air-conditioning fan when the air-conditioning fan operates is led to an air passage extending from the air-conditioning fan to the outlet; and a flow path switching means for controlling the open/close member to open the communication member and controlling the second switching member to achieve the third state in a ventilation mode and for controlling the open/close member to close the communication member and controlling the second switching member to achieve the fourth state in a mode other than the ventilation mode.

10. An automotive ventilation apparatus comprising:

an air-conditioning fan having an inlet and an outlet;

an inside air intake port configured to take in an inside air, the inside air intake port being in fluid communication with the fan via the inlet of the fan;

an outside air intake port configured to take in an outside air, the outside air intake port being in fluid communication with the fan via the inlet of the fan, wherein a connection point in the fluid communication between the inside air intake port and the fan is located between the fan and a connection point in the fluid communication between the outside air intake port and the fan;

an air-conditioning flow path forming member that forms an air-conditioning flow path through which the inside air via the inside air intake port or the outside air via the outside air intake port is taken in and guided to a ventilation outlet directly facing a space inside a cabin when the air-conditioning fan operates, the ventilation outlet being in fluid communication with the fan via the fan's outlet;

a first switching member configured to switch between a first state in which the inside air taken in via the inside air intake port is led to the air-conditioning flow path and a second state in which the outside air taken in via the outside air intake port is led to the air-conditioning flow path;

a communication port being located so as to be in fluid communication with the fan via the fan's inlet, wherein a connection point in the fluid communication between the communication port and the fan is located between (1) the connection point in the fluid communication between the inside air intake port and the fan and (2) the connection point in the fluid communication between the outside air intake port and the fan, wherein the communication port is directly facing an internal space behind an instrument panel, the instrument panel comprising external surfaces facing towards the cabin and internal surfaces opposing the external surfaces, the internal space comprising a volume being bordered by the internal surfaces and fluidly communicating directly with the air-conditioning flow path by the communication port;

an open/close member configured to open and close the communication port;

an air discharge flow path forming member that forms an air discharge flow path branching from the air-conditioning flow path located so as to be in fluid communication with the fan via the fan's outlet and extends to outside of the cabin; and a second switching member configured to switch between a third state such that an air flow located downwind of the air-conditioning fan when the air-conditioning fan operates is led to the air discharge flow path and a fourth state such that the air flow located downwind of the air-conditioning fan when the air-conditioning fan operates is led to an air passage extending from the air-conditioning fan to the ventilation outlet, wherein, in a ventilation mode, the communication port is configured to be opened by the open/close member and the second switching member is configured to be in the third state, wherein, in a mode other than the ventilation mode, the communication port is configured to be closed by the open/close member and the second switching member is configured to be in the fourth state.

11. An automotive ventilation apparatus according to claim 10, further comprising a control device configured to control the open/close member to open the communication port and to control the second switching member to achieve the third state in the ventilation mode and configured to control the open/close member to close the communication port and to control the second switching member to achieve the fourth state in the mode other than the ventilation mode.

12. An automotive ventilation apparatus according to claim 10, wherein the communication port is configured such that an upper portion of the internal space behind the instrument panel fluidly communicates with the air-conditioning flow path located upwind of the air-conditioning fan.

13. An automotive ventilation apparatus according to claim 10, wherein the communication port is configured such that a lower portion of the internal space behind the instrument panel fluidly communicates with the air-conditioning flow path located upwind of the air-conditioning fan.

14. An automotive ventilation apparatus according to claim 10, wherein the air-conditioning fan is a blower fan used for air-conditioning.

* * * * *